Jan. 22, 1963   J. DOYEN   3,075,034
ACTIVATOR FOR DRY-CHARGED ELECTROCHEMICAL
BATTERIES AND THE LIKE
Filed June 5, 1959   2 Sheets-Sheet 1

INVENTOR:
JEAN DOYEN
BY
AGENT

Jan. 22, 1963   J. DOYEN   3,075,034
ACTIVATOR FOR DRY-CHARGED ELECTROCHEMICAL
BATTERIES AND THE LIKE
Filed June 5, 1959   2 Sheets-Sheet 2

INVENTOR:
JEAN DOYEN

BY

*Karl F. Thom*
AGENT

United States Patent Office 3,075,034
Patented Jan. 22, 1963

3,075,034
ACTIVATOR FOR DRY-CHARGED ELECTROCHEMICAL BATTERIES AND THE LIKE
Jean Doyen, Paris, France, assignor to Yardney International Corp., New York, N.Y., a corporation of New York
Filed June 5, 1959, Ser. No. 818,316
Claims priority, application France June 9, 1958
7 Claims. (Cl. 136—90)

My present invention relates to an activator for dry-charged electrochemical batteries.

An object of this invention is to provide means for reliably and rapidly placing an activating liquor, such as electrolyte, in contact with a plurality of electrode assemblies of respective battery cells.

Another object of my invention is to provide improved means for developing a sudden and sustained rise in gas pressure adapted to activate a dry-charged electric battery or the like in response to an external signal.

A feature of this invention resides in the use of an explosive charge as a means for increasing the pressure in a duct which forms part of or communicates with the interior of a piston cylinder wherein a piston is operatively coupled with one or more displaceable members whose movement from a normal position results in the activation of a corresponding number of battery cells.

Another feature of this invention resides in the combination of a cartridge containing an explosive charge, with an originally sealed storage container for a compressed gas adapted to be un-sealed by the ignition of the said charge, the explosion gases combining with the gas from the storage container to exert a rapidly increased sustained pressure upon a responsive device such as, for example, the aforementioned piston.

The invention will be described in greater detail with reference to the accompanying drawing in which.

Figure 1:
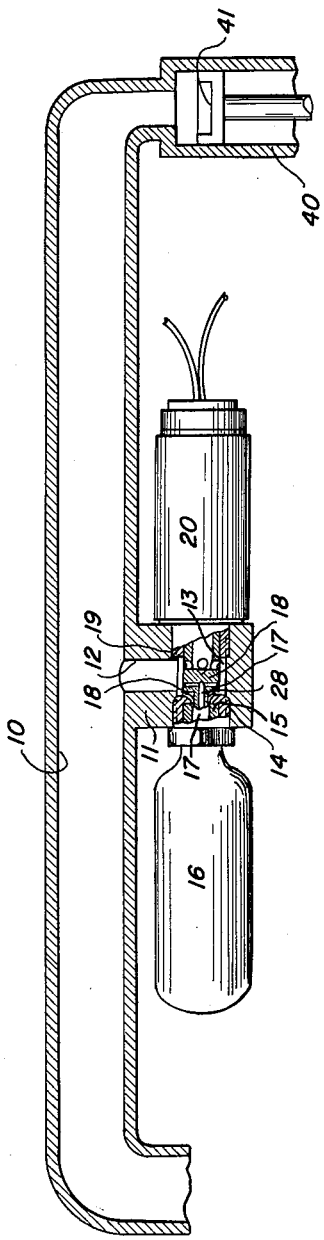
FIGURE 1 is an elevational view, partly in section, of the principal elements of an activator according to my invention in an operated position.
Figure 2:
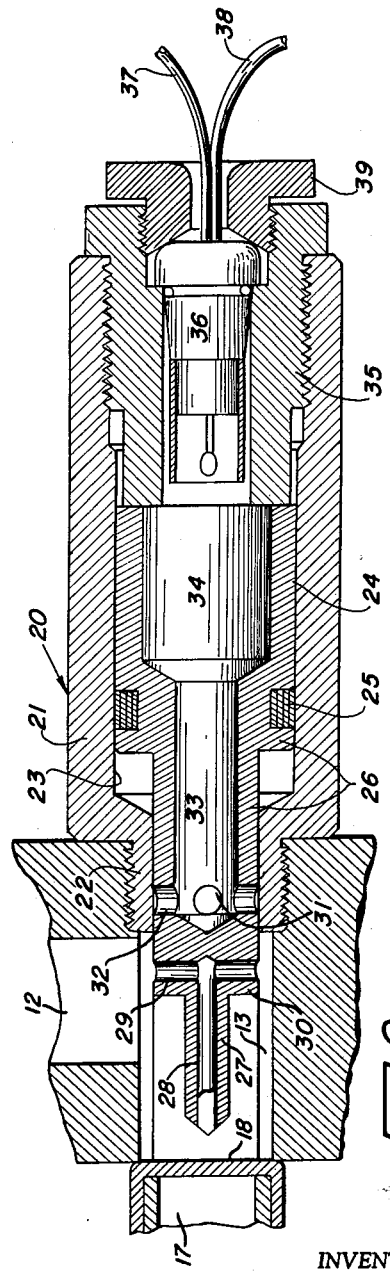
FIGURE 2 is an enlarged section of a view of a part of the assembly of FIGURE 1, shown in their pre-activation position.

Reference will first be made to FIGURES 1 and 2. FIGURE 1 shows a duct 10 which terminates at a cylinder 40 in whose interior a piston 41 is slideably disposed. Piston 41 may be connected with any load but, in the preferred utilization of my invention, is operatively coupled with a mechanism for establishing contact between a liquid electrolyte and a dry-charged electrode assembly as more fully described in connection with the piston 118 of FIGURE 4.

The duct 10 is provided with a lateral boss 11 having a bore 12 which opens into the duct. Boss 11 also has a transverse passage 13 communicating with bore 12 to form a T-shaped channel. Threadedly inserted into the left-hand end 14 of passage 13 is the neck 15 of a bottle 16 containing a gas under pressure; neck 15 has an outlet 17 initially sealed by a rupturable diaphragm 18. Opposite this diahpragm, in the right-hand end 19 of passage 13, there is threadedly inserted a cartridge 20. The left-hand end of duct 10 may be closed or may lead to another piston cylinder, not shown, similar to cylinder 40.

As best seen in FIGURE 2, cartridge 20 comprises a sleeve 21 terminating in a threaded neck 22 by which it is screwed into the bore 11. A cylindrical chamber 23 within sleeve 21 accommodates an axially slidable plunger 24 provided with an annular packing strip 25. The stem 26 of plunger 24 projects outwardly through neck 22 and terminates in a diaphragm-piercing point 27 directed towards the membrane 18 of gas container 16. Point 27 has an axial bore 28 communicating with a transverse bore 29 which pierces the projecting part 30 of stem 26. Normally withdrawn inside the neck 22 are orifices 31 and 32 in stem 26 which communicate with a central bore 33 thereof opening into a chamber 34 within the body of plunger 24. Opposite the open end of chamber 34, a plug 35 is threadedly inserted into sleeve 21; plug 35 houses a squib 36 which is held in position by a screw cap 39 and can be detonated by an electric signal applied to its leads 37 and 38. Squib 36 contains a suitable explosive powder.

Figure 3:
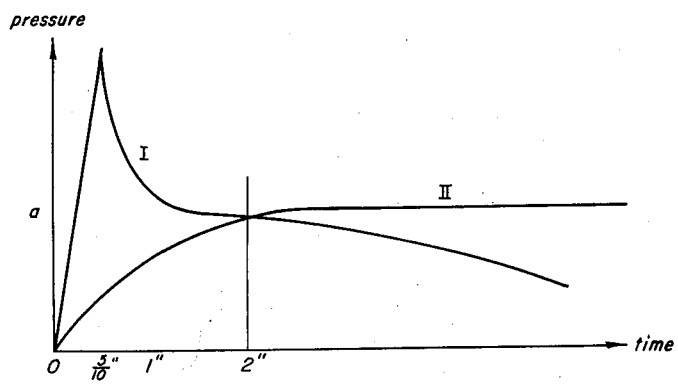
FIGURE 3 is a graph illustrating the mode of operation of the activator of FIGURES 1 and 2.

In operation, detonation of squib 36 causes the developing explosion gases to exert pressure upon the plunger 24, thereby driving the point 27 through the diaphragm 18 and releasing the gas held under pressure in bottle 16; as soon as the orifices 31 and 32 have cleared the neck 22, these explosion gases are free to pass into the bore 12 and through it into the duct 10. At the same time the gas from bottle 16 finds a path through bore 28 and passage 29 into bore 12 and duct 10 where it mingles with the explosion gases. The ensuing rise in pressure acts upon the piston 41 to produce the desired activating operation. As indicated in FIGURE 3, the pressure due to the explosive gases alone (represented by Curve I) rises sharply in the first half of a second (line a) and thereafter drops gradually towards 0; at the same time the pressure due to the gas within bottle 16 (Curve II) builds up gradually to a substantially constant level designed to maintain the piston 41 in its displaced position. Advantageously, the cartridge 20 is designed to develop sufficient activating pressure by itself so that the mechanism will not fail even if a leak should have developed in bottle 16 prior to its discharge.

Figure 4:
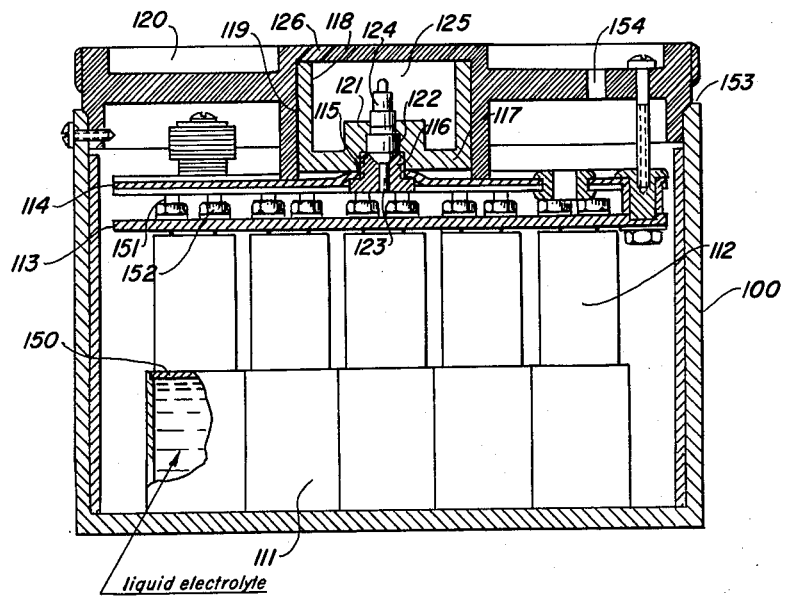
FIGURE 4 is a sectional elevation of a battery assembly incorporating a modified activator according to the invention.

In FIGURE 4 I have illustrated a battery assembly whose housing 100 contains a plurality of cell casings 111 each internally provided with a rupturable diaphragm 150. An electrode assembly 112 is poised above each casing 111 and is suspended from a platform 113 common to all of these assemblies. The electrodes of each assembly 112 are precharged so that an output voltage will be developed across the associated terminals 151, 152 whenever the platform 113 is lowered so that each electrode assembly pierces the diaphragm 150 of the corresponding casing 111 and plunges into the liquid electrolyte there below. In order to allow for such operation, platform 113 (which occupies only a part of the cross-section of the housing 100) is part of a vertically slidable unit which also includes a plate 114 with a central aperture 115 accommodating a nut 116. The latter threadedly engages the bottom 117 of a piston 118 which is vertically slidable in a chamber 125. This chamber is formed by cylindrical walls 119 depending from the central part 126 of a lid 120 of the housing. Piston bottom 117 also has a boss 121 with an inner chamber 122 communicating with the interior of housing 100 through a narrow port 123 in nut 116. Boss 121 also mounts a cartridge 124 similar to cartridge 20 of the preceeding embodiment. When the cartridge 124 is detonated, its explosion gases rapidly expand inside chamber 125 and drive the piston 118 downwardly, thereby plunging electrode assemblies 112 into cell casings 111 as previously described.

A retaining screw 153 serves as a safety device to prevent untimely activation of the battery assembly. An orifice 154 in lid 120 allows for the ventilation of the interior of the assembly after activation.

The invention is, of course, not limited to the specific embodiments described and illustrated but may be realized in values modifications without departing from the spirit and scope of the appended claims.

I claim:

1. A system for developing a sudden and sustained increase in gas pressure in a duct, comprising a cartridge adapted to discharge explosion gases into said duct upon being detonated, a container of fluid under pressure having a discharge port opening into said duct, frangible seal means initially blocking said port, and activator means responsive to said combustion gases for unblocking said port, said activator being provided with communicating axial and transverse bores for conducting said fluid from said container to said duct.

2. A system according to claim 1 wherein said duct is provided with an inlet passage, said cartridge and said container facing each other across said inlet passage, said activator means comprising a displaceable projection on said cartridge adapted to be propelled across said passage by said combustion gases.

3. A system according to claim 2 wherein said cartridges is provided with a neck forming a channel for said combustion gases, said projection being displaceably held in said channel.

4. A system according to claim 3 wherein said cartridge comprises a detonating chamber and a plunger slidable within said chamber, said plunger having a stem terminating in said projection.

5. A system according to claim 4 wherein said stem is provided with a bore communicating with said chamber, said bore having an outlet initially blocked by said neck but opening into said passage upon an advance of said plunger sufficient to break said seal.

6. A system according to claim 5 wherein said seal is a diaphragm, said projection comprising a tubular pin and having a lateral aperture communicating with the interior of said pin for directing the fluid from said container into said passage upon a piercing of said diaphragm by said pin.

7. An activator for dry-charged electric cells comprising a piston cylinder, a piston in said cylinder, activating means operatively coupled with said piston, a duct leading to said cylinder and having a dependent inlet passage closed at its remote end, a cartridge positioned to discharge explosion gases into said inlet passage, a container of compressed gas having a discharge port opening into said inlet passage and blocked by a frangible seal means, said cartridge and gas container facing each other across said inlet passage, said cartridge comprising a body portion, a neck portion, a detonating chamber and a slidable plunger slidable within said chamber and adapted to be moved in response to the explosion of explosive powders maintained in said detonating chamber, said plunger being provided with a puncturing end having communicating axial and transverse bores adapted to break said fangible seal means on the engagement thereof, said plunger being further provided with conduit means adapted to deliver explosive gases to said inlet passage on the movement of the end of said conduit beyond the neck portion of said cartridge, said plunger being adapted to first puncture said frangible seal whereby said compressed gases are released to said inlet passage and then to deliver the explosive gases to said inlet passage whereby a sudden and then a sustained increase in pressure is experienced in said duct.

References Cited in the file of this patent

UNITED STATES PATENTS

| | | |
|---|---|---|
| 979,153 | Gugler | Dec. 20, 1910 |
| 2,674,946 | Hjelm | Apr. 13, 1954 |
| 2,776,734 | Hackett | Jan. 8, 1957 |
| 2,783,291 | Gold | Feb. 26, 1957 |
| 2,850,556 | Hermitte | Sept. 2, 1958 |
| 2,857,890 | Stott | Oct. 28, 1958 |
| 2,937,220 | Bauman | May 17, 1960 |